United States Patent [19]

Pelton

[11] 4,238,264
[45] Dec. 9, 1980

[54] AEROSOL BARRIER PACKAGE WITH A BAG ADHESIVELY ATTACHED TO THE CURL

[75] Inventor: Peter G. Pelton, St. Louis, Mo.

[73] Assignee: The Continental Group, Inc., New York, N.Y.

[21] Appl. No.: 3,329

[22] Filed: Jan. 15, 1979

[51] Int. Cl.² .................. B29C 17/00; B29C 27/24
[52] U.S. Cl. .................................. 156/212; 156/294; 156/287; 264/268; 264/269; 264/516
[58] Field of Search ............... 220/460, 461, 85 B; 156/287, 293, 294, 303.1, 299, 212; 264/268, 269, 516

[56] References Cited

U.S. PATENT DOCUMENTS 4,117,951  10/1978  Winckler ........................... 220/461
4,127,430  11/1978  Davis ................................. 156/287

*Primary Examiner*—William J. Van Balen
*Attorney, Agent, or Firm*—Charles E. Brown

[57] ABSTRACT

A barrier aerosol package wherein a product bag is positioned in a container and has the upper portion gathered and sealed to the container curl defining a valve cup receiving opening. A tool is provided for receiving the upper part of the product bag and supporting the bag for the application of a band of adhesive, after which the tool is utilized to collapse the bag while uniformly folding or gathering that part of the bag to which the adhesive has been applied. The tool then applies the collapsed bag to the container and trims the excess bag material, after which the bag is inflated to restore its initial configuration followed by the removal of the tool.

8 Claims, 7 Drawing Figures

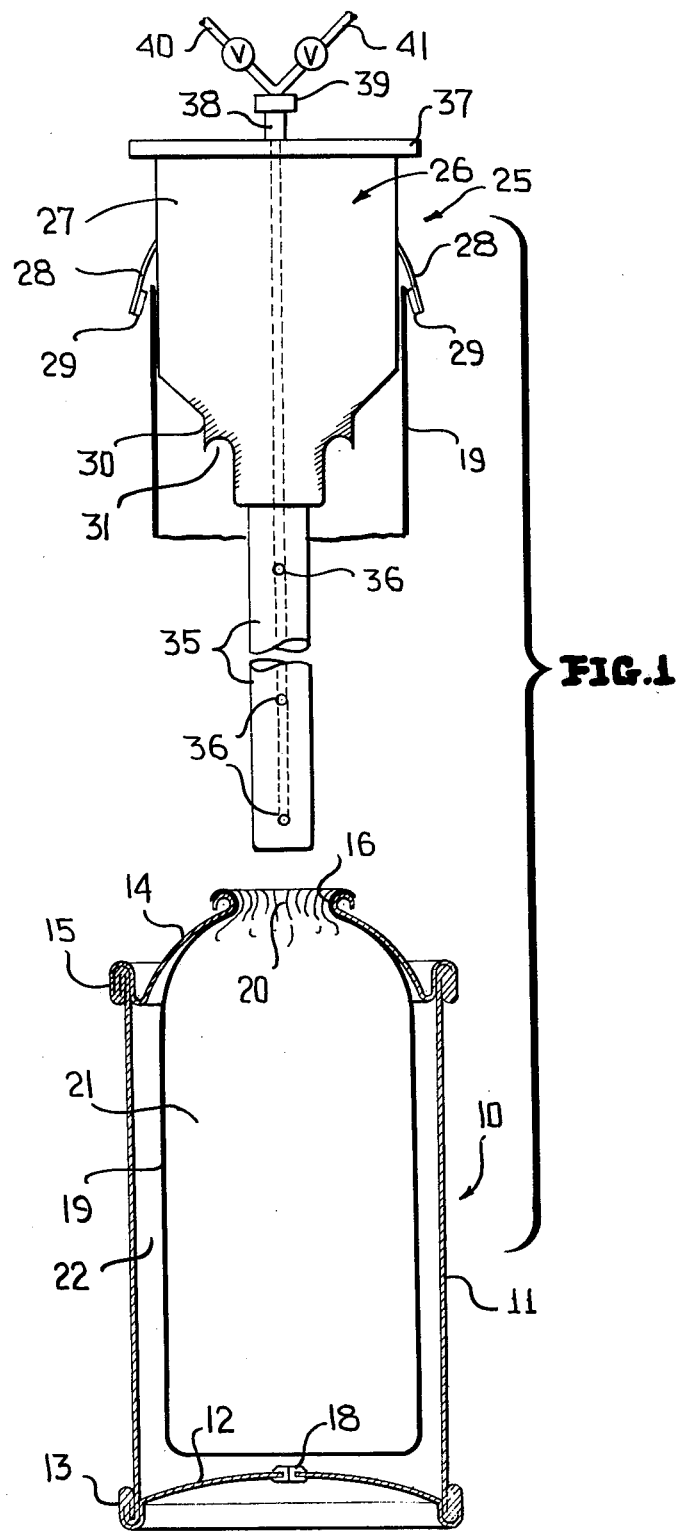

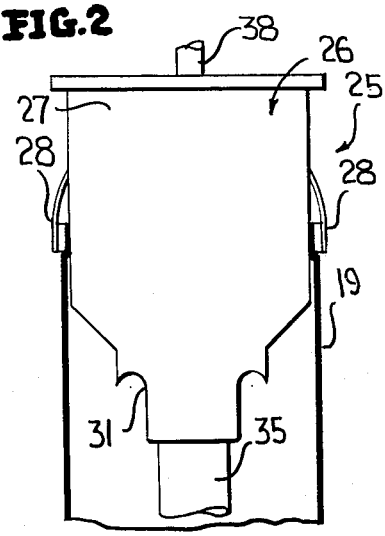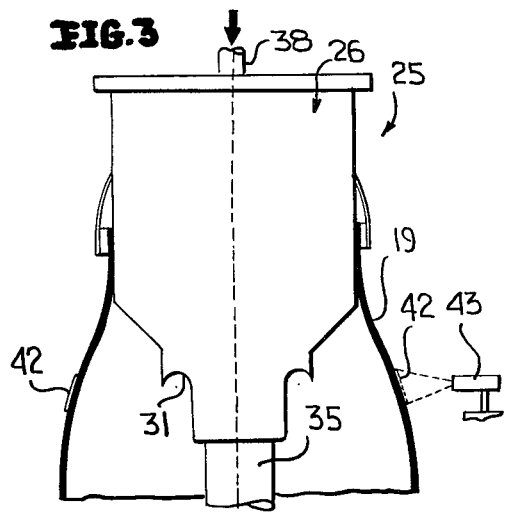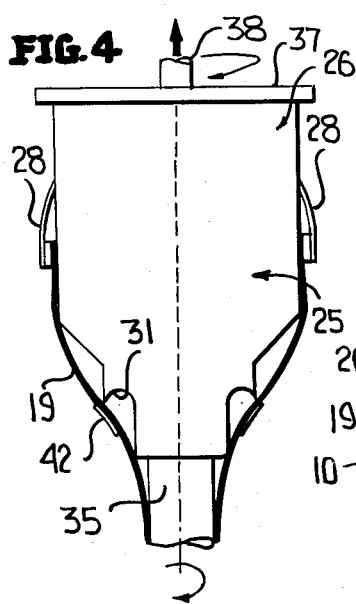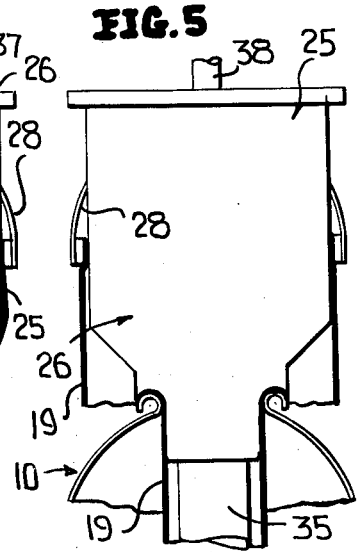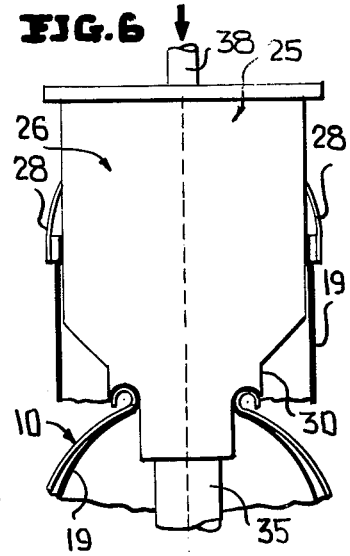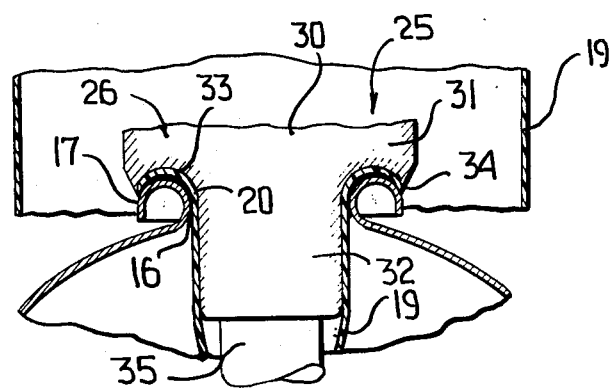

AEROSOL BARRIER PACKAGE WITH A BAG ADHESIVELY ATTACHED TO THE CURL

This invention relates in general to new and useful improvements in aerosol barrier packages, and more particularly to a package wherein the product bag is adhesively bonded to the can end unit curl.

In accordance with this invention, there is provided a cylindrical product bag which is formed of a suitable plastics material film and which may be of a laminated construction. The bag is generally formed of a film having very poor stretch characteristics, and accordingly the bag is of a diameter approaching the internal diameter of the associated container. However, it is necessary in accordance with this invention that an upper part of the bag be reduced in diameter and the same be securely adhered to the curl of the top end unit of the container which defines the customary valve cup receiving opening. In accordance with this invention, adhesive is applied to the exterior of the upper part of the product bag while it is in an expanded condition, after which the product bag is collapsed to a size wherein it is passable through the valve cup receiving opening and, while in such collapsed state, bondable to the curl.

Most particularly, in accordance with this invention there is provided a tool having a body of a size corresponding to the normal cross sectional size of the product bag wherein the product bag may be telescoped with respect to the tool body and form a general seal therewith. The tool is provided with suitable grippers for retaining the bag on the tool.

The tool is also provided with an extension tube having ports therein through which a light air pressure is first directed so as lightly to inflate the product bag and wherein, after the product bas has been so lightly inflated, a suitable adhesive may be sprayed onto the exterior of the product bag in that area which is positioned for sealing engagement with the container curl.

The tool is also operative to create a vacuum within the product bag so as to effect a controlled collapsing of the product bag around the tube. The tube may be rotated relative to the tool body to facilitate a controlled folding of the product bag as it collapses.

With the product bag collapsed to a size smaller than the opening defined by the container curl, the tool is utilized to insert the product bag into the container. The tool body is also provided with a lower portion which is configured forcibly to wedge the upper portion of the product bag within the curl and also to conform the next upper portion of the product bag to the exterior configuration of the curl, whereby the product bag is bonded to the curl in sealed relation by way of the previously applied adhesive.

The tool is also provided with a cutter which cooperates with the curl to trim the upper part of the bag.

After the bag has been positioned within the container and while the upper part is still firmly clamped against the curl, the bag may be inflated so as to open the bag and effect a conformation of the bag to the general configuration of the container.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a schematic elevational view with parts broken away and shown in section of a container supplied with a product bag, and shows the tool utilized in positioning the product bag, the tool being withdrawn from the container.

FIG. 2 is a schematic elevational view with the product bag shown in section of the product bag as it is first applied to the tool.

FIG. 3 is another schematic view similar to FIG. 2, and shows the product bag slightly expanded and having an adhesive applied to the exterior surface thereof.

FIG. 4 is a schematic view similar to FIG. 2, and shows the product bag collapsed about an extension tube of the tool.

FIG. 5 is another schematic view showing the product bag positioned within the associated container and with the upper portion thereof clamped against the curl for bonding thereto.

FIG. 6 is a schematic view showing the product bag clamped to the container curl, and with the product bag expanded within the container.

FIG. 7 is an enlarged fragmentary view showing the relationship of the lower part of the tool body with the container curl as the product bag is forced into sealed engagement with the container curl.

Referring now to the drawings in detail, reference is first made to FIG. 1 wherein there is illustrated an aerosol barrier container generally identified by the numeral 10. The illustrated container 10 includes a conventional can body 11 having a lower end closed by an end unit 12 secured thereto by a seam 13. The upper end of the can body 11 is closed by an upper end unit 14 of the breast type. The end unit 14 is secured to the body 11 by a conventional seam 15 and defines an upper central valve cup receiving opening 16 by way of a curl 17. The end unit 12 is provided with a propellant charging port 18 which may be suitably sealed.

The aerosol barrier container 10 also includes a product bag 19 which has a gathered upper portion 20 which extends out of the container 10 and is suitably adhesively bonded to the curl 17 in sealed relation.

It is to be noted that the product bag 19 fills a major portion of the container 10 and per se defines a product compartment 21. The product bag 19 also, together with the can body 11 and end units 12, 14, defines a propellant compartment 22.

The product bag 19 is of a readily collapsible construction and maintains a complete separation of the product and the propelling gas. It is formed of a suitable plastics material film and may be of a laminated construction. Generally speaking, the bag has very poor expansion characteristics and is not stretchable by a product placed therein. Accordingly, it is necessary that the upper portion of the product bag be gathered so that it may pass through the valve cup receiving opening 16. The gathering of the material of the bag presents a problem in forming a desired seal between the bag and the curl. In accordance with this invention, a uniform folding or gathering of the upper portion of the bag is effected and the adhesive which bonds the bag to the curl also bonds together the folded portions of the bag.

Also illustrated in FIG. 1 is a tool which is utilized in the positioning of the product bag 19 within the aerosol container 10. The tool is generally identified by the numeral 25 and includes a body 26. An upper portion of the body 26 is preferably of a size corresponding to the nominal size of the bag 19 so that when the upper portion of the bag 19 is telescoped over the body upper portion 26 generally speaking a seal will be effected.

The body upper portion 27 is provided with suitable grippers 28 which have pads 29 which engage the bag upper portion and serve to hold the bag upper portion telescoped with respect to the body upper portion 27. The grippers 28 may be simply of a spring loaded type or could be provided with suitable actuators (not shown). The sole purpose of the grippers 28 is to hold the upper part of the product bag 19 telescoped with the tool 25 during application of the product bag.

The tool body 26 also includes a lower portion 30 which is of a gradually reducing diameter and which terminates in a bag seating portion 31. As is best shown in FIG. 7, the bag seating portion 31 includes a lower plug portion 32 of a diameter to be received in the valve cup receiving opening 16 with the gathered bag portion 20 disposed between the plug portion 32 and the curl 17.

The plug portion 32 terminates at its upper end in an upwardly and outwardly turned seat portion 33 which is configured to match the upper portion of the curl 17 and tightly clamp an intermediate part of the bag 19 against the upper part of the curl.

The tool body portion also includes a peripheral cutter 34 which is engageable with the curl 18 and in cooperation therewith functions to sever or trim the upper part of the product bag 19 after the product bag 19 has been positioned within the associated container.

The tool 25 also includes an extension tube 35 which depends from the plug portion 32 and which is of a length corresponding generally to the height of the product bag 19 when assembled within the aerosol container. The extension tube 35 has a plurality of ports 36 opening therethrough with the ports 36 being spaced about the periphery thereof.

Preferably the extension tube 35 is mounted for rotation about its axis relative to the tool body 26. Suitable means may be provided for effecting rotation of the extension tube. However, for purposes of illustration, there is positioned above the tool body 26 a disk 37 which is attached to the extension tube 35 and may be utilized for effecting the desired rotation of the extension tube.

The tool 25 also is provided with a port defining line 38 which is in communication with the interior of the extension tube 35 and which is coupled by means of a suitable rotary union 39 to a pressurized air line 40 and to a vacuum line 41, each of which is provided with a suitable control valve.

In accordance with this invention, a product bag 19 which is to be inserted within a container 10 has the upper part thereof telescoped over the upper portion 27 of the tool body 26, as is shown in FIG. 2. The product bag 19 is clamped in place relative to the tool body 26 by means of the grippers 28.

With the product bag firmly secured to the tool 25, air under a light pressure on the order of 0.5 p.s.i.g. is admitted into the product bag 19 through the extension tube 35. When the bag 19 is so lightly inflated, the upper portion thereof is free of wrinkles and defines an uninterrupted continuous surface to which a suitable adhesive 42 may be applied. For illustration purposes, the adhesive 42 is shown in FIG. 3 as being applied by way of a spray nozzle 43 which may either be fixed and the tool 25 rotated or which may rotate relative to the tool 25 and the product bag 19 to apply a continuous band of adhesive around the product bag 19.

After the adhesive 42 has been applied to the product bag 19, a vacuum is drawn within the product bag through the extension tube 35 with the result that the product bag collapses about the extension tube 35 and generally about the lower portion of the tool body 26 as shown in FIG. 4. After the product bag collapses about the extension tube 35, the extension tube 35 is rotated, such as by effecting rotation of the disk 37, and the rotation of the extension tube 35 causes a like rotation or twisting of the product bag. Since the upper part of the product bag 19 is held in place relative to the tool body 26 by the grippers 28, it will be seen that a uniform gathering or pleating of the portion of the product bag to which the adhesive 42 has been applied is effected. This uniform gathering or pleating is highly desirable in that the gathered portion 20 of the product bag must be engaged with the curl 17 and form a seal therewith against escape of gas from the propellant chamber 22.

The collapsed product bag 19 is of a size to be freely passed into the container body 11 through the valve cup receiving opening 16, and this is accomplished utilizing the tool 25, as shown in FIG. 5. With particular reference to FIG. 7, it will be seen that the portion of the product bag 19 to which the adhesive 42 has been applied is tightly clamped against the curl 17 and held in that clamped relation sufficiently to effect a setting of the adhesive. Depending upon the nature of the adhesive 42, heat may be required at this time.

It will be seen that after the product bag 19 is applied to the curl 17, the cutting element 34 of the tool 25 cooperates with the curl 17 to trim an upper part of the product bag 19 from that which is applied to the container 10.

It is also to be noted that the plug portion 32 of the tool 25 tightly compresses the gathered portion 20 of the product bag 19 against the inner portion of the curl 17 so as to flatten out the gathered portion 20 for the customary reception of the valve cup (not shown). Thus when the valve cup is applied, as the valve cup is radially outwardly expanded relative to the curl 17, notwithstanding the folding or gathering of the product bag 19, a seal against escape of the product under pressure from between the product bag and the valve cup is assured.

With the gathered portion 20 of the product bag 19 firmly clamped against the curl 17, air under a light pressure is again admitted into the interior of the product bag so as to expand the product bag to its product receiving configuration as shown in FIG. 1. This is effected in the manner shown in FIG. 6.

Referring once again to FIG. 1, it will be seen that after the product bag 19 has been positioned within the can 10 and sealed to the curl 17 by the adhesive bonding, the tool 25 is withdrawn and the trimmed upper part of the product bag 19 is released from the tool. The tool 25 is now ready to receive another product bag for inserting the same into another container.

Although only a preferred embodiment of the invention has been specifically illustrated and described herein, it is to be understood that minor variations may be made in the container construction, the tool and the mode of utilizing the tool to apply the product bag without departing from the spirit and scope of the invention as defined by the appended claims.

I claim:

1. A method of positioning a product bag in an aerosol can, said method comprising the steps of providing an aerosol can having a valve cup opening defined by a curl with the valve cup opening being of a diameter less than that of the can, providing a product bag of a size generally corresponding to that of the can, engaging the product bag with a tool, drawing a vacuum in the product bag to collapse the product bag and reduce the cross sectional size thereof, inserting the product bag into the can through the valve cup opening, seating an upper portion of the product bag on the curl, and inflating the product bag within the can.

2. The method of claim 1 wherein an adhesive is applied to the exterior of the product bag upper portion prior to the insertion of the product bag into the can for bonding the product bag upper portion to the curl.

3. The method of claim 2 wherein the adhesive is applied before the product bag is reduced in cross sectional size.

4. The method of claim 2 wherein prior to drawing a vacuum in the product bag the the product bag is inflated, and the adhesive is applied at that time.

5. The method of claim 1 together with the added step of trimming that upper part of the product bag extending above the curl.

6. The method of claim 1 wherein during the collapsing of the product bag the product bag is restrained at the open end thereof and the opposite portion is rotated about the general axis of the product bag to provide a uniform folding of that part of the product bag which will seat on the curl.

7. The method of claim 2 wherein during the collapsing of the product bag the product bag is restrained at the open end thereof and the opposite portion is rotated about the general axis of the product bag to provide a uniform folding of that part of the product bag to which the adhesive is applied.

8. The method of claim 6 wherein the collapsing of the product bag occurs about an internal support.

* * * * *